April 26, 1927.
N. A. WRIGHT
1,626,371
SPRAYING ATTACHMENT FOR TRACTORS
Filed May 25, 1923
4 Sheets-Sheet 1
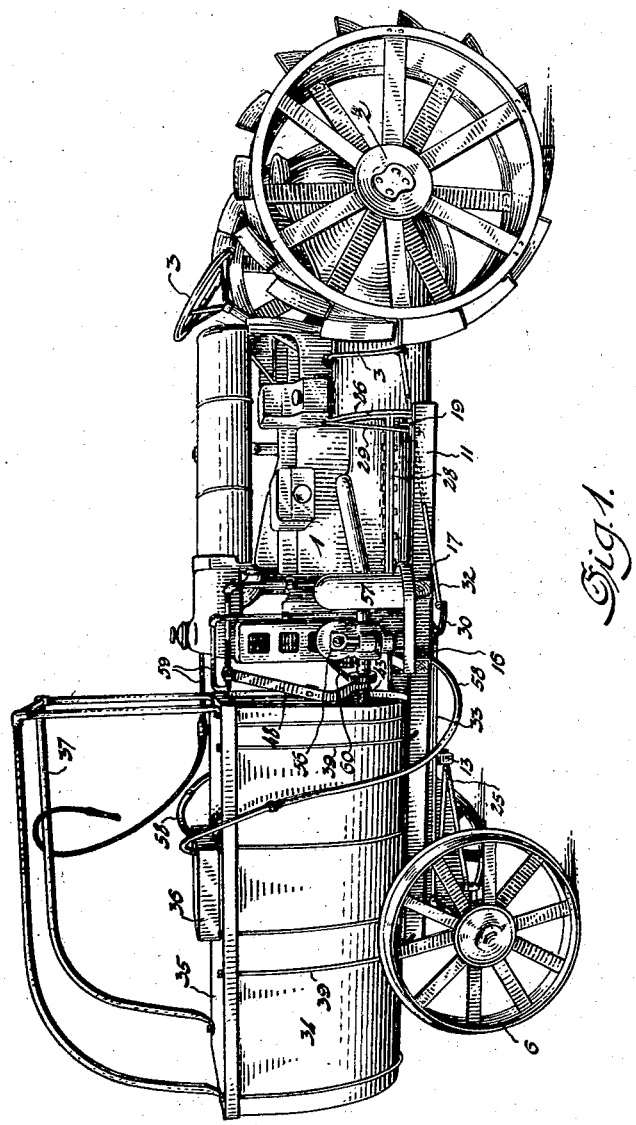

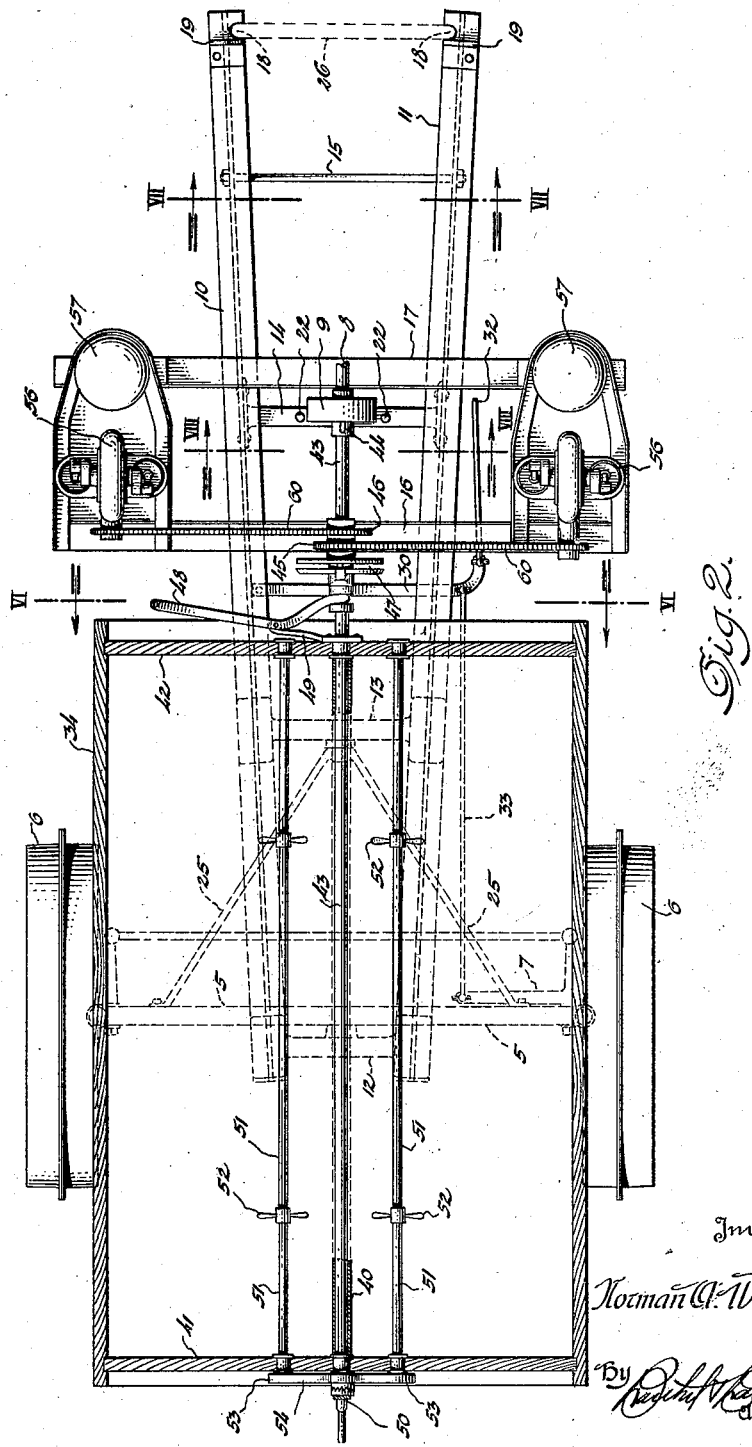

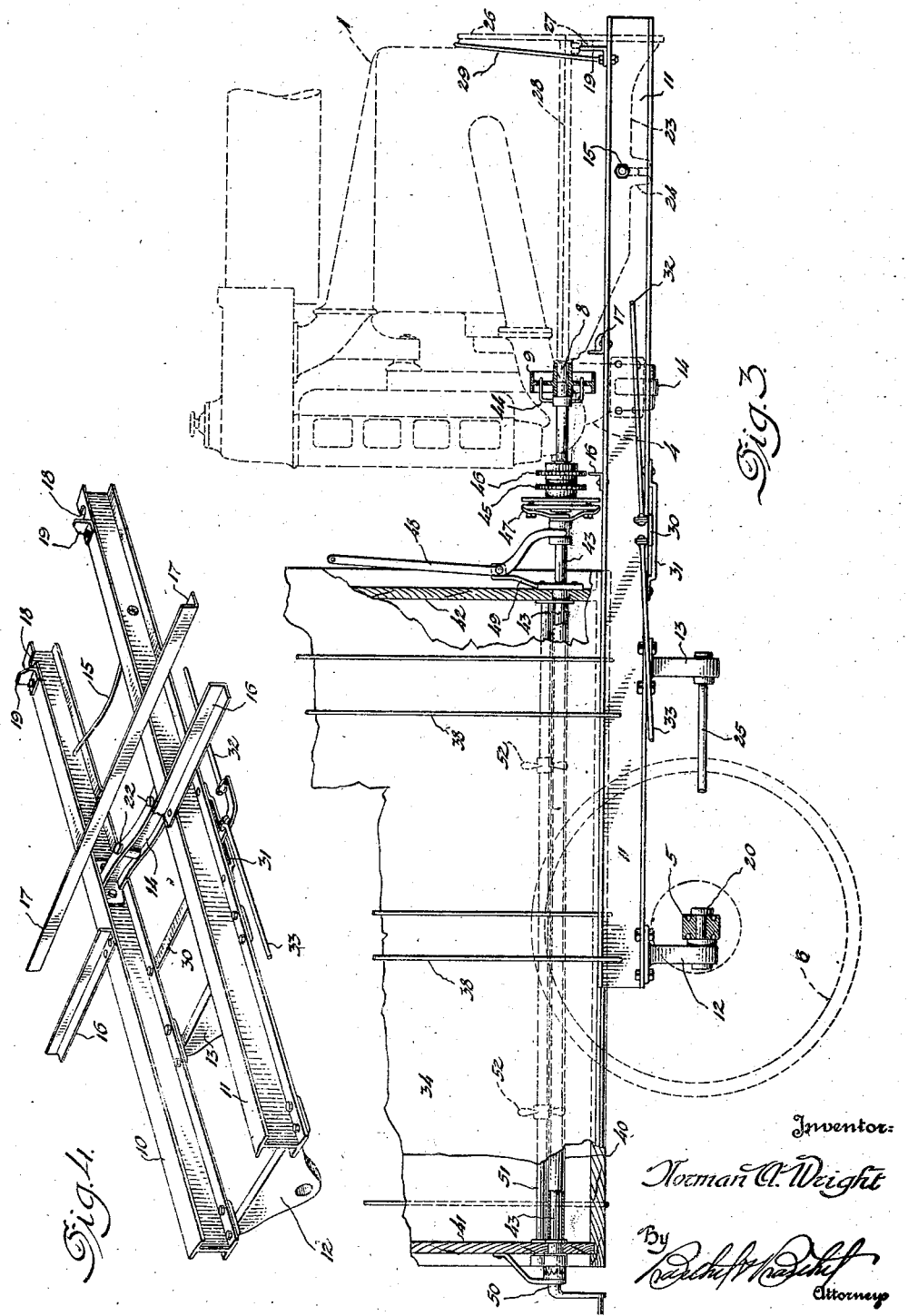

April 26, 1927. 1,626,371
N. A. WRIGHT
SPRAYING ATTACHMENT FOR TRACTORS
Filed May 25, 1923 4 Sheets-Sheet 4
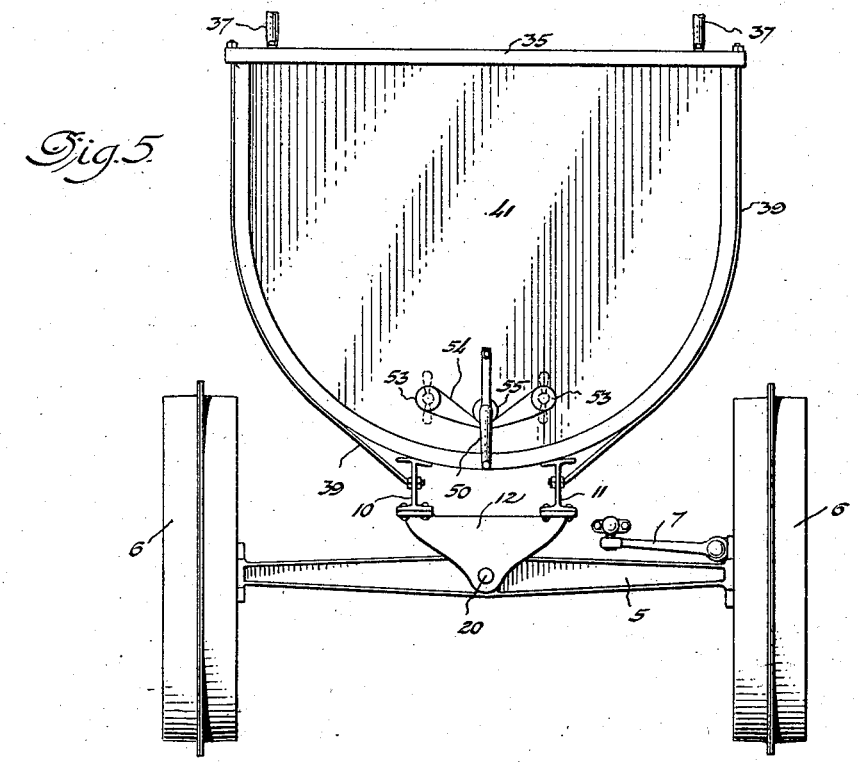
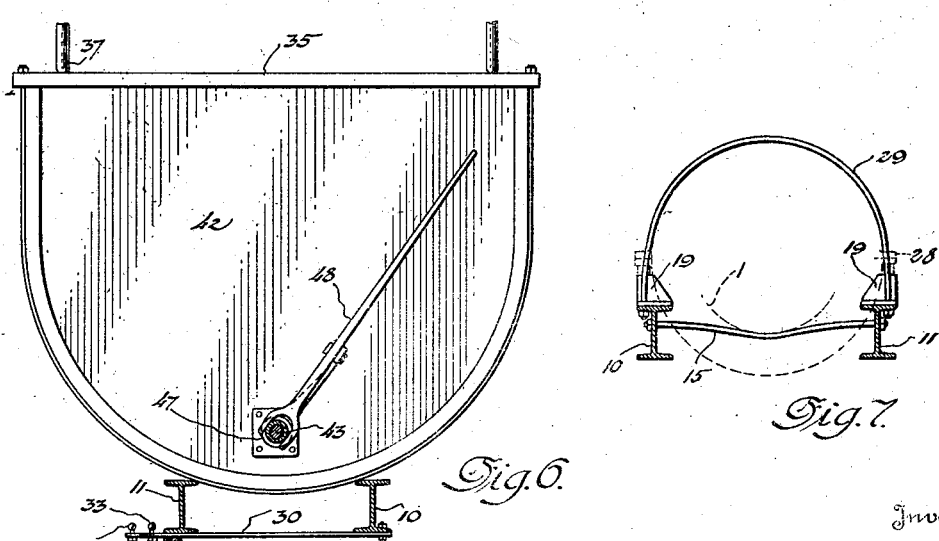
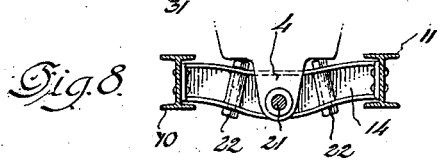
Inventor:
Norman A. Wright Patented Apr. 26, 1927.

1,626,371

UNITED STATES PATENT OFFICE.

NORMAN A. WRIGHT, OF PONTIAC, MICHIGAN, ASSIGNOR TO PONTIAC TRACTOR COMPANY, OF PONTIAC, MICHIGAN, A CORPORATION OF MICHIGAN.

SPRAYING ATTACHMENT FOR TRACTORS.

Application filed May 25, 1923. Serial No. 641,332.

Ever since a tractor has proven to be so popular and practical for the fruit grower there has been many experiments to adapt it to the work of spraying. The demand for such a sprayer has long been felt both by the large orchardist where spraying has been done on a large scale and by the great class of growers of limited acreage who do all their work with the tractor and only keep horses for spraying.

The big disadvantage found in adapting the tractor to the work of spraying was the necessity of trailing a tank behind, making it impossible to get into close quarters or rather to get out of close quarters, for instance, from one grape row to another; the requirement of long hose connections between tractor and tank which are often broken by being caught in the wheels, and in every way proven unsatisfactory, and, further, the necessity for an auxiliary engine to operate an agitator or else a crude makeshift agitator driven by traction alone.

My invention overcomes the above disadvantage by lengthening the wheel base of the tractor and mounting a tank in front of the power plant of the tractor, so that there will be a four-wheel vehicle that can be readily moved about in close quarters. To increase the wheel base of an ordinary tractor, I remove the front axle assembly and attach to the tractor body a rigid frame which may have its forward end supported by the front axle assembly with the tank secured on the frame.

My invention further aims to provide a universal tractor attachment including a frame which also supports pumps, driven from the tractor engine, for spraying the contents of the tank on the forward end of the frame. Provision is made for controlling the operation of the pump from the tractor engine so that there may be a cessation in the operation of the pumps, particularly when the tractor is being moved from one locality to another.

My invention further aims to combine a well known type of tractor and a large tank to form a rigid and stiff body between front and rear axle assemblies and while my attachment has been especially designed for orchard spraying purposes, I may use the tractor tank combination for other purposes.

My invention further aims to provide an extension frame for a tractor by which the wheel base of the tractor may be lengthened from the power plant forward and the greater part of the frame may be used as a support for any structure that may be conveniently associated with the tractor.

My tractor attachment will be hereinafter specifically described and then claimed and reference will now be had to the drawings, wherein Figure 1 is a perspective view of a tractor in accordance with this invention;

Fig. 2 is a plan of the tractor attachment showing the tank in horizontal section;

Fig. 3 is a side elevation of the tractor attachment, partly broken away and partly in section;

Fig. 4 is a perspective view of the extension frame of the tractor;

Fig. 5 is a view of the front end of the tractor attachment;

Fig. 6 is a cross sectional view taken on the line VI—VI of Fig. 2;

Fig. 7 is a cross sectional view taken on the line VII—VII of Fig. 2; and

Fig. 8 is a cross sectional view taken on the line VIII—VIII of Fig. 2.

In the drawings, I have illustrated a conventional form of tractor including a power plant 1 and the necessary accessories; a rear axle assembly 2; a steering gear 3; a front end bearing 4 which is usually supported by a front axle assembly including an axle 5, steering wheel 6 and steering knuckle connections 7; and, an engine driven shaft 8 having the usual fan belt pulley 9. The elements thus far recited are well known and other parts of the tractor will be hereinafter referred to when describing the tractor attachment.

The tractor attachment comprises an extension frame tapering inwardly from its rear end to its forward end and said frame is composed of two side members 10 and 11, preferably of the I-beam construction. The lower lateral flanges of these side members are connected by a front end bearing 12 and a radius rod hanger 13, while the webs of said side members are connected by a cradle or transverse member 14 and a tie rod 15. On the upper lateral flanges of the side members 10 and 11 are transverse supports 16 and 17 disposed in parallelism and extending laterally from the sides of the extension frame. The upper flanges of the side members, at the rear ends thereof, are notched, as at 18, and provided with brackets 19 adjacent said notches.

To attach the extension frame to the tractor the forward end of the tractor is propped up and the front axle assembly disconnected. The front end bearing 12 of the extension frame is then connected to the axle 5 by a pivot connection 20 and the extension frame is placed under the power plant of the tractor with the front end bearing 4 fitting down over the cradle or transverse member 15 to which cradle or transverse member it may be connected, as at 21. This is best shown in Fig. 8 where it will be noted that the cradle or transverse member has adjustable abutments 22 for engaging under the sides of the front end bearing 4 to prevent said front end bearing from rocking relative to the cradle or traverse member 14.

The transverse tie rod 15 extends under the crank case 23 of the power plant 1 and engages in the usual fork or member 24 to which the radius rods 25 of the front axle assembly have been heretofore connected. Since the front axle assembly has been advanced to a position considerably forward of the power plant 1, the radius rods 25 are now connected to the hanger 13 of the extension frame.

The notches 18 at the rear end of the extension frame are adapted to receive a coupling flange 26 of the tractor with the brackets 19 abutting bolts or fastening means 27 of the flange 26 and supporting lateral flanges 28 forming part of the crank case 23 and the engine block of the tractor. An inverted U-shaped tie rod 29 extends over the rear end of the engine block, as best shown in Figs. 3 and 7 with the ends of the tie rod attached to the extension frame at the brackets 19. The rear end of the extension frame is now tied to the forward end of the power plant with the transverse supports 16 and 17 at the forward end of the power plant with plenty of room on the forward end of the extension frame for a structure, to be hauled by the tractor. The wheel base of the tractor has been lengthened and in order that the tractor steering gear 3 may be utilized for steering the front wheel 6, a transversely disposed lever 30 is pivotally connected to the side member 10 and extends through a supporting strap 31 attached to the side member 11. The free end of the lever 30 is connected by a rod 32 to the steering gear 3 and by a rod 33 to the steering knuckle connections 7.

Mounted on the forward end of the extension frame is a substantially semi-cylindrical tank 34 that may be made of wood or metal with a top serving as a platform 35 provided with a filling opening 36 for the tank. On the platform 35 is a guard rail 37 for a person that may stand on the tank during the operation of spraying trees, vines or other plants.

The tank 34 has its forward end overhanging the front axle assembly and the end of the extension frame with the rear end of the tank in close proximity to the radiator of the tractor, and as illustrating attaching means for retaining the tank on the forward end of the extension frame, I show side tie rods 38 which have the upper ends thereof connected to the platform 35 and the lower ends thereof connected to the webs of the side frames 10 and 11, as best shown in Fig. 5. The upper inner lateral flanges of the side members 10 and 11 may be depressed or shaped to afford a seat for the bottom of the tank with such seat cooperating with the tie rods in preventing displacement of the tank.

Extending longitudinally of the tank 34, in proximity to the bottom thereof, is a tubular casing 40 which has its ends mounted in the end walls 41 and 42 of the tank 34. Journaled in this tubular casing is a starter shaft 43 longitudinally alining with the engine driven shaft 8. The rear end of the starter shaft 43 is suitably coupled, as at 44, to the pulley 9 of the shaft 8 and loose on the starter shaft 43, between the tank 34 and the pulley 9 are the hubs of sprocket wheels 45 and 46 which are adapted to be fixed to the starter shaft 43, for rotation therewith, by a conventional form of clutch mechanism 47 normally establishing a driving relation between the starter shaft 43 and the sprocket wheels 45 and 46. The clutch mechanism 47 may be actuated by a lever 48, pivotally supported by a bracket 49 on the tank end wall 42, to release the sprocket wheels 45 and 46 relative to the starter shaft, thus permitting movement of the tractor without driving the sprocket wheels. The lever 48 may have a rearwardly extending connection or operating device which will permit of the clutch mechanism being controlled from the operator's seat of the tractor.

The front end wall 41 of the tank 34 is provided with a conventional form of starting crank or device by which the starter shaft 43 may be rotated to facilitate starting the power plant of the tractor.

Journaled in the end walls 41 and 42 of the tank 34 are the ends of agitator shafts 51 disposed in parallelism contiguous to the tubular casing 40. On these shafts are agitators 52 of a conventional form adapted to agitate the contents of the tank 34 so as to maintain a uniform spraying mixture within the tank. The forward ends of the shafts 51 are provided with pulleys 53 for an endless belt 54 trained under a pulley 55 mounted on the forward end of the starter shaft 43 and in consequence of this power transmission the agitator shafts 51 will be operated in synchronism with the starter shaft.

Mounted on the transverse supports 16 and 17 are pump units, one at each side of the extension frame, each pump unit including a spray pump 56 and a reservoir 57, said pump and reservoir having suitable connections, particularly hose connections 58 extending through the filling opening 36 of the tank 34, and outlet connections 59 to which may be connected one or more spray nozzles or guns, see Fig. 1. The pumps 56 are adapted to be driven by endless sprocket chains 60 from the sprocket wheels 45 and 46 of the starter shaft 43. If only one spray nozzle is to be used it is only necessary to withdraw one of the hose connections 58 from the tank 34 and the pump of such withdrawn hose connection will simply idle.

My invention in its broadest aspect involves the forwardly extending frame which places the front axle assembly some distance in advance of the power plant and lengthens the usual wheel base of the tractor. There may be instances when the forward end of the extension frame can be used for other purposes than that of supporting the tank of a spraying apparatus, particularly in the winter time, therefore I do not care to confine my invention to any specific use other than may be set forth in the appended claim.

What I claim is:—

A spraying apparatus adapted to be applied to a Fordson tractor by separating the front axle assembly from the power plant of the tractor, said apparatus comprising a frame having means of connection to the tractor power plant and the front axle assembly, a tank on the front end of said frame, a shaft extending through said tank and having at its rear end means for coupling it to the crank shaft of the tractor, whereby said tank shaft may be used for starting said power plant when the spraying apparatus is attached to the tractor, a pump supported from the side of said frame at the rear of said tank, said pump being operatively connected to said tank and to said tank shaft, an agitator in said tank, and driving connections between said agitator and said tank shaft.

In testimony whereof I affix my signature.

NORMAN A. WRIGHT.